United States Patent
Roberts et al.

(10) Patent No.: US 6,195,194 B1
(45) Date of Patent: Feb. 27, 2001

(54) LIGHTWEIGHT ELECTROCHROMIC MIRROR

(75) Inventors: John K. Roberts, Grand Rapids; Edward L. DeNave, Zeeland; Kent J. Ypma, Grand Rapids; Keith J. Timmer, Grandville, all of MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/270,153

(22) Filed: Mar. 16, 1999

(51) Int. Cl.[7] .............................. G02F 1/153; G02F 1/15; G02F 1/155; F21V 33/00

(52) U.S. Cl. .......................... 359/267; 359/265; 359/266; 359/271; 362/135

(58) Field of Search .................................. 359/267, 265, 359/266, 269, 271; 362/494, 135

(56) References Cited

U.S. PATENT DOCUMENTS

| | | |
|---|---|---|
| 4,902,108 | 2/1990 | Byker . |
| 5,818,625 | 10/1998 | Forgette et al. . |
| 5,910,854 * | 6/1999 | Varaprasad ............................ 359/273 |
| 6,000,823 * | 12/1999 | Desmond ............................. 362/494 |
| 6,064,508 * | 5/2000 | Forgette ................................ 359/267 |

FOREIGN PATENT DOCUMENTS

WO9530495    11/1995   (WO) .

* cited by examiner

*Primary Examiner*—Georgia Epps
*Assistant Examiner*—Michael A Lucas
(74) *Attorney, Agent, or Firm*—Brian J. Rees; Price, Heneveld, Cooper, DeWitt & Litton

(57) ABSTRACT

A mirror and housing assembly includes a multi-layer electrochromic (EC) mirror subassembly supported by a carrier. The EC mirror subassembly includes a front transparent element and a rear element, each having front and rear surfaces, a reflector on one of the surfaces of the rear element, and further includes a seal spacing the front and rear elements apart to define a chamber therebetween. An EC material, such as solution phase, gel phase, solid phase, or a hybrid EC material, fills the chamber and is electrically connected to a control for controlled dimming of reflections from the reflector. The front and rear elements each are characteristically very thin, such as about 1.6 mm to 0.8 mm, or more preferably 1.2 mm to 1.0 mm, and most preferably 1.1 mm, such that the EC mirror subassembly is characteristically surprisingly and unexpectedly low in weight. This makes the front and rear elements flexible and sensitive to bending in a thickness direction, which can result in unacceptable distortion of the reflector. However, the carrier includes a support surface supporting the rear element in a co-extensive flat manner and a retainer holding the EC mirror subassembly in a uniform manner that minimizes bending and deforming the rear element in the thickness direction. Several different reflector and carrier arrangements are shown for accomplishing non-distorting support for the EC mirror subassembly.

38 Claims, 8 Drawing Sheets

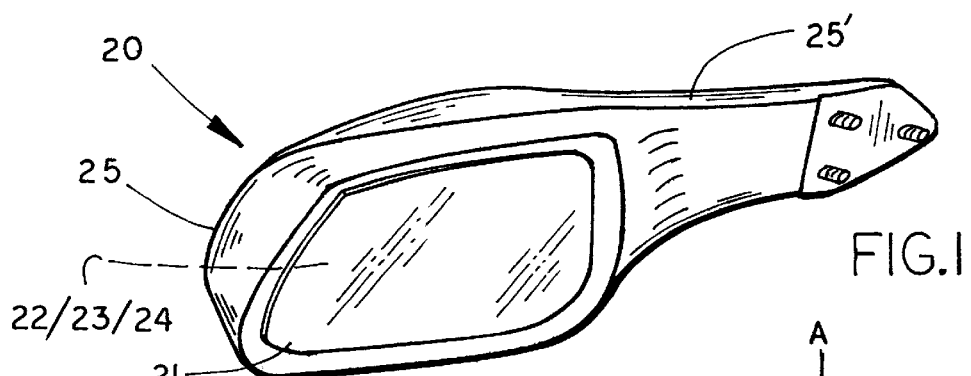

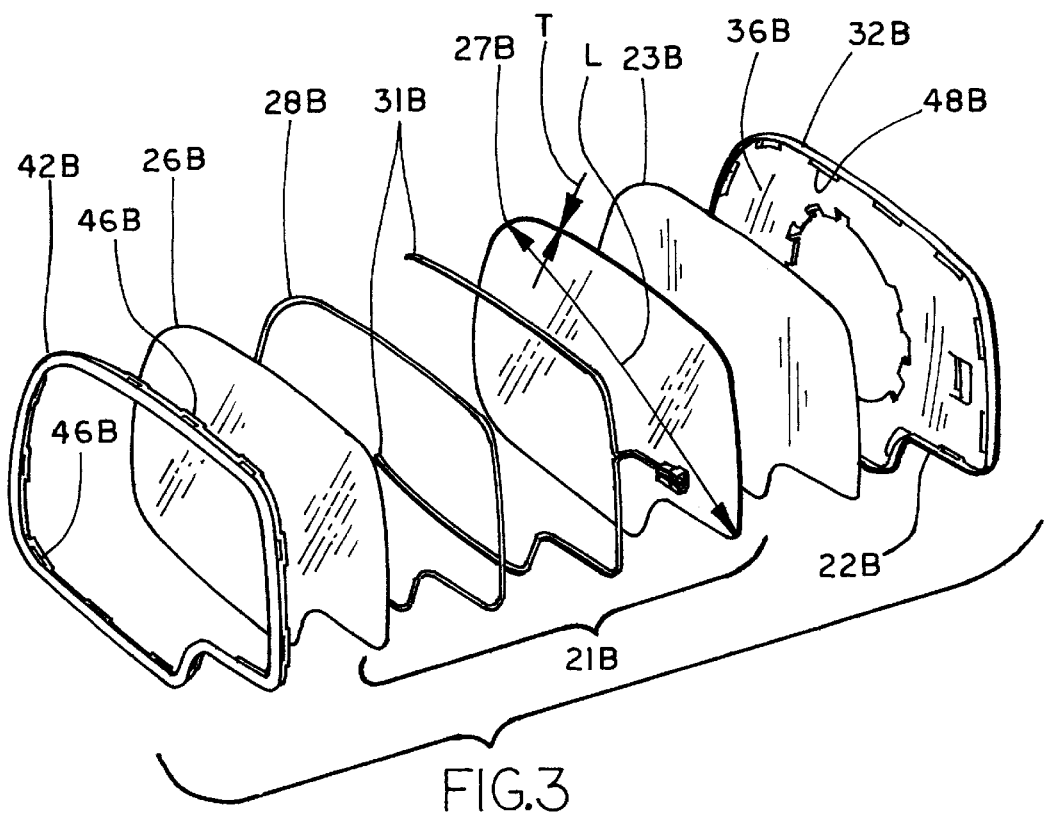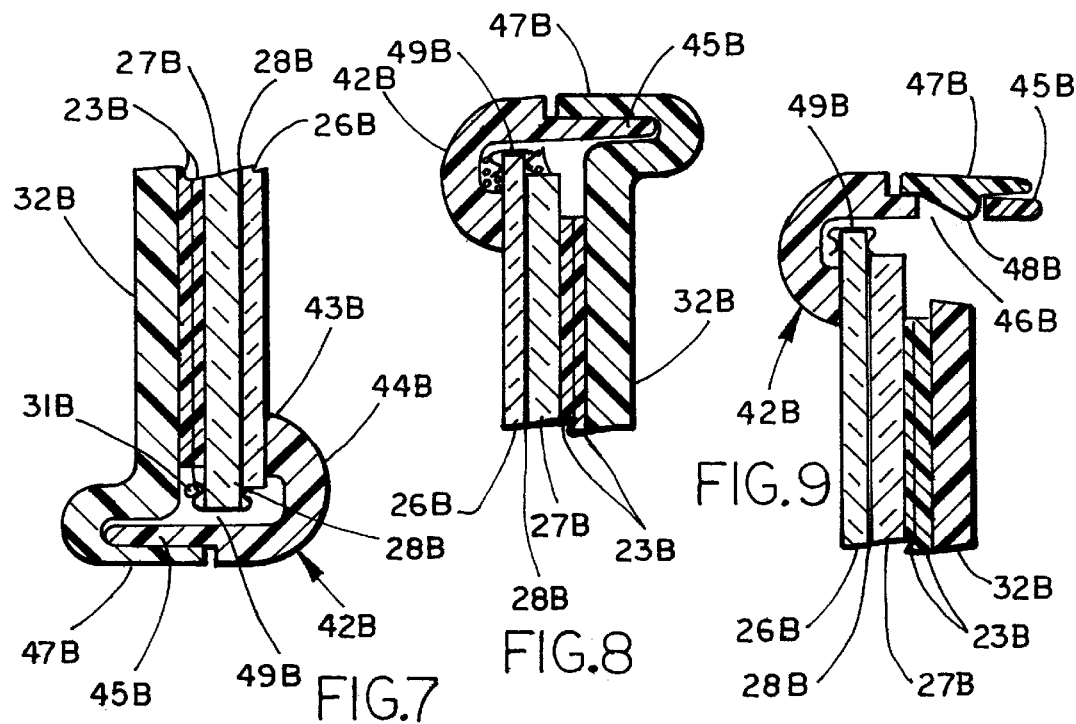

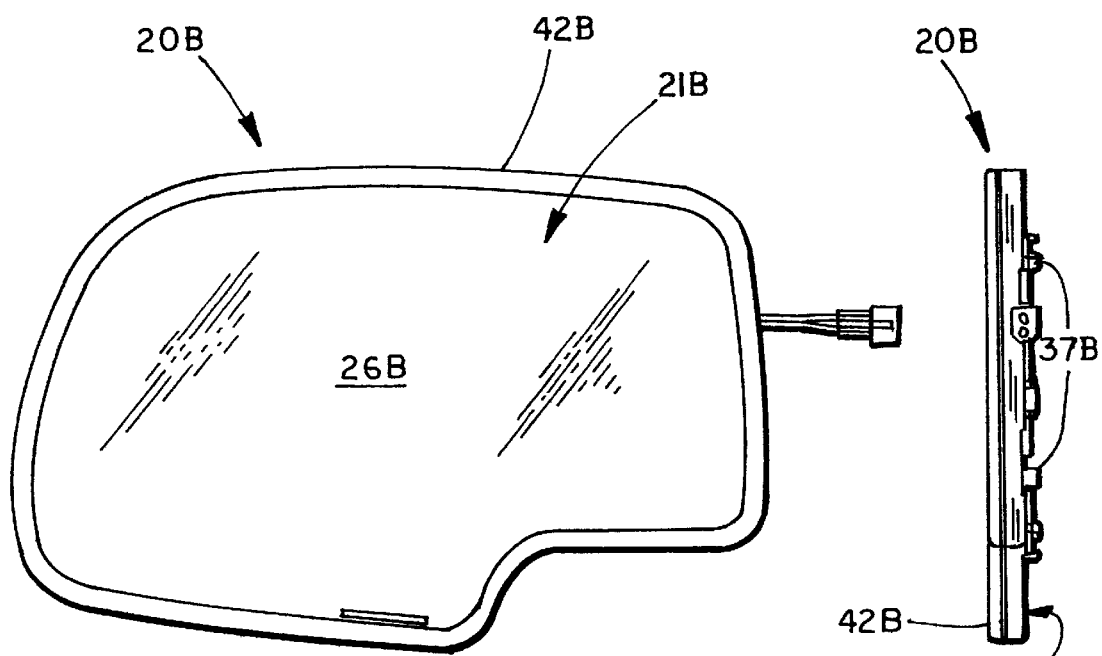
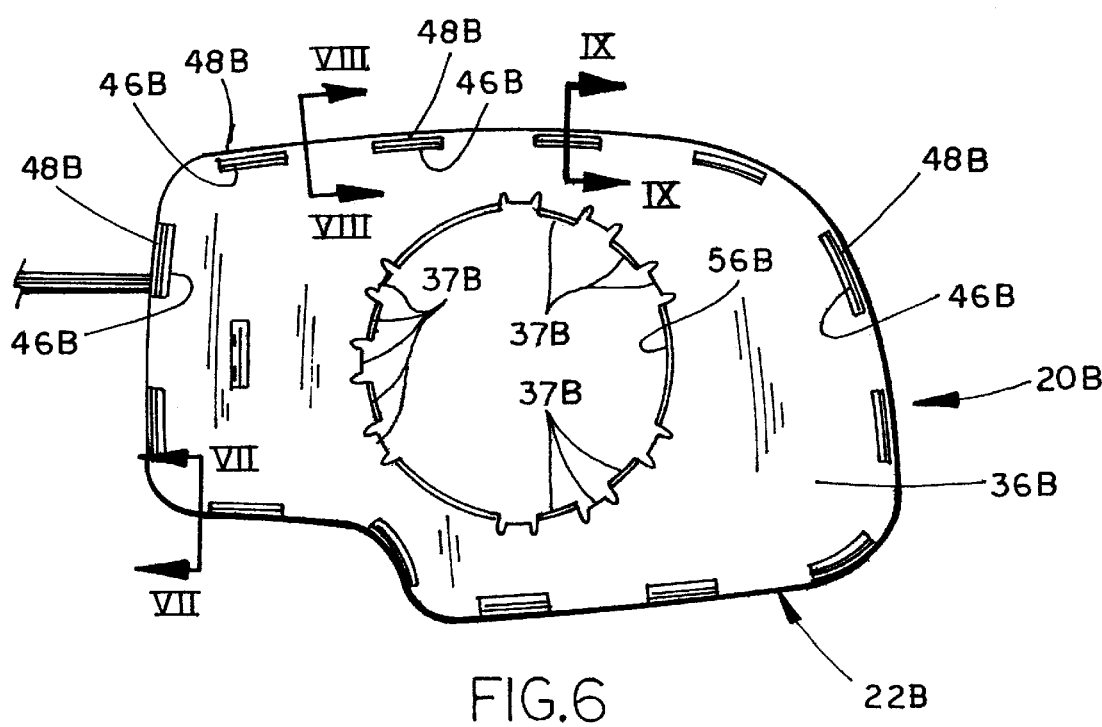

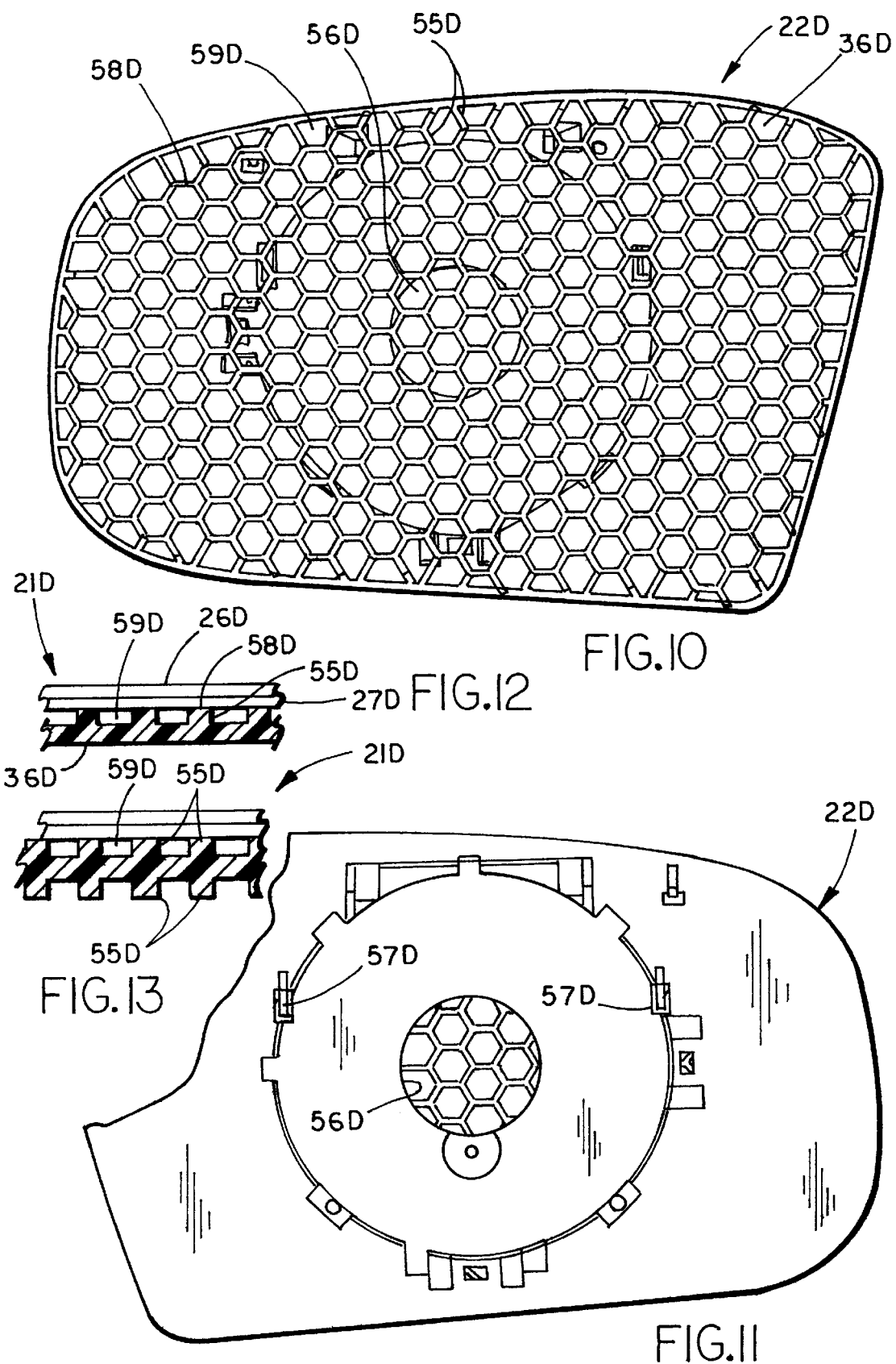

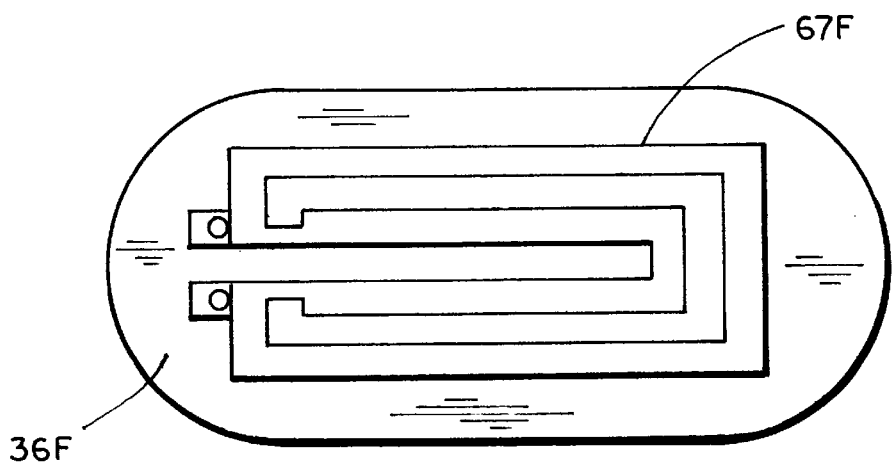
FIG.16A
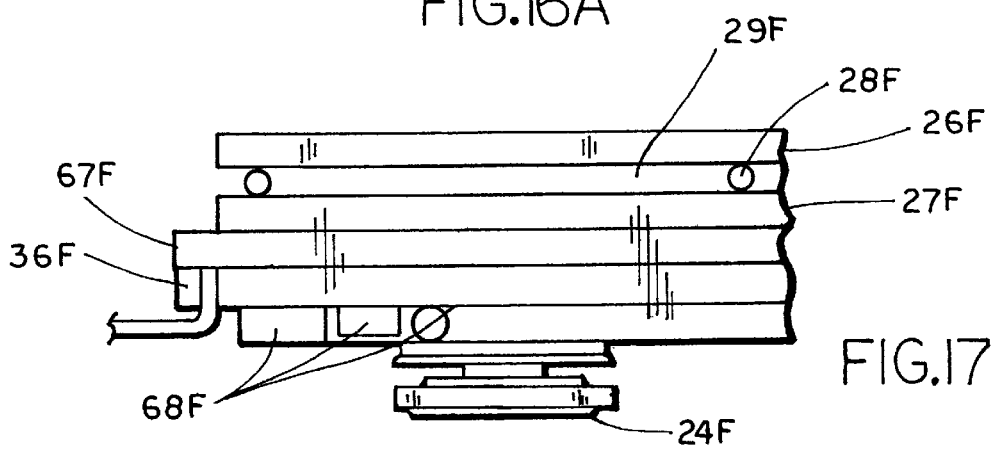
FIG.17
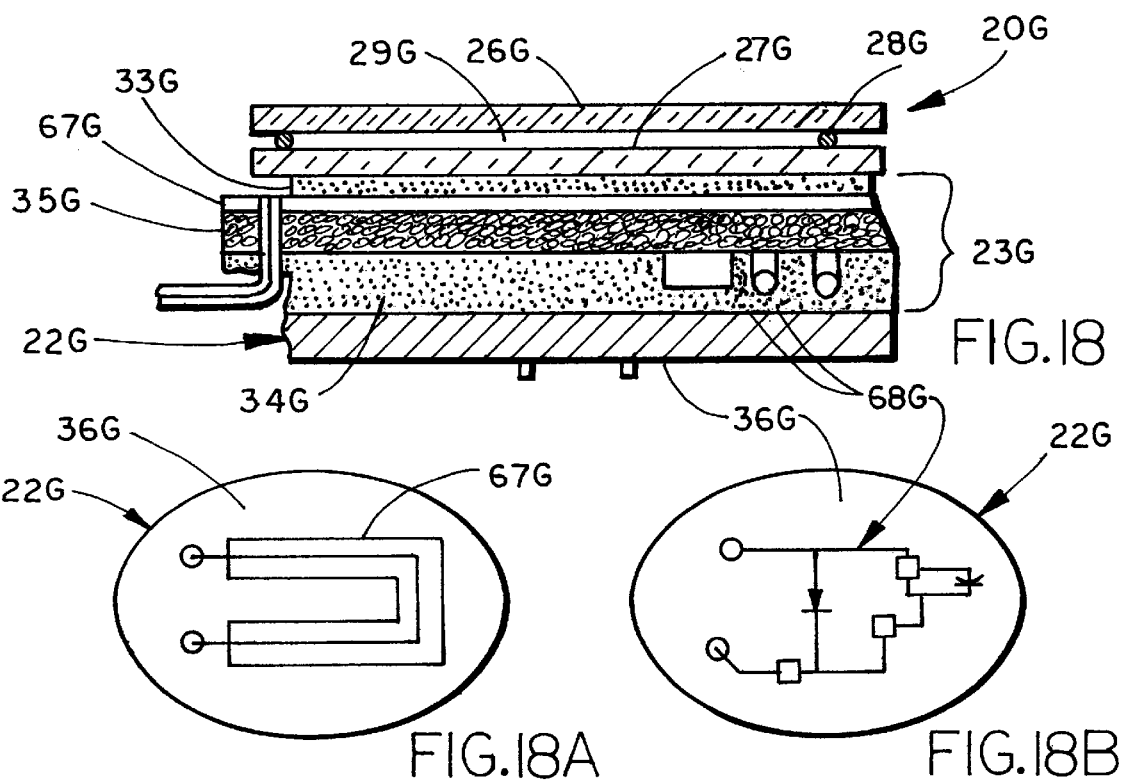
FIG.18
FIG.18A    FIG.18B

LIGHTWEIGHT ELECTROCHROMIC MIRROR

BACKGROUND OF THE INVENTION

The present invention concerns lightweight, electrochromic (EC) mirrors for vehicles.

There is a constant need for weight reduction in vehicles in order for vehicle manufacturers to stay competitive. The reasons are many and varied, but include such things as meeting customer demands for improved gas mileage through reduced vehicle weight; obtaining the benefit of government incentives through improved gas mileage, reduced pollution, and reduced curb weight; reducing part cost by reducing material costs; and other engineering and marketing considerations. Concurrently, there are reasons to improve mirrors in ways which may increase weight, such as to increase the size of mirrors to increase the reflected viewing area; to increase the structural strength of mirror elements to reduce distortion of reflected images; and to increase the structural support provided for mirrors to withstand vibration and pendulum-like harmonic movement of the mirrors when a vehicle is moving along a highway. Clearly, there is tension between the need to reduce vehicle weight and the need to improve mirrors.

In addition to the above, vehicle mirrors have environmental problems unique to their application. Automotive mirrors must be stable under high vibration conditions and also must remain undistorted in a wide range of temperatures and operating conditions in order to be effective. Due to inherent limitations in vehicle design and mirror support design, most interior and exterior rearview mirrors are supported in cantilever. However, the dynamic vibrational stability of a mirror is inversely proportional to its cantilevered mass and, accordingly, vibration is often a problem in vehicle mirrors, particularly in heavier mirrors. Therefore, lighter mirror weights and those having shorter cantilever arms are desired. Improvements have been made in mirror housings to make them lighter, stiffer, and more aerodynamic. However, glass remains a large percentage of the overall weight of mirrors. The reason glass continues to be used is because it has high transmission of light and it is very durable. Unfortunately, glass has a relatively high specific gravity. Further, glass is somewhat flexible and deformable, unless the thickness of glass mirror elements is kept at or above the 2.2 mm thickness dimension that most conventional mirrors use. In other words, prior to the present inventive improvements, the thickness of glass must be maintained at thickness levels sufficient to provide adequate stiffness in order for the glass to remain rigidly flat enough to support a reflector to provide a distortion free reflection.

Vehicle manufacturers have recently begun manufacturing vehicles with interior and exterior EC mirrors due to their advantages over non-EC mirrors. EC mirrors have the advantage of undergoing controlled dimming to eliminate glare from bright lights, such as to eliminate glare in a driver's eyes from the headlights of other vehicles. However, EC mirrors tend to be heavy because they utilize two glass elements with an EC material (solution phase, solid phase, gel phase, or a hybrid thereof) therebetween. The reflectance of the mirror is controlled by creating an electrical voltage potential across the EC layer as glaring lights are sensed behind the vehicle. Unfortunately, EC mirrors tend to weigh more than conventional mirrors due to the "double thickness" of glass.

There are significant mounting problems associated with using "extra" thin glass elements (i.e., glass elements having a thickness of about 1.6 mm or less), because these extra thin glass elements are so thin that they are susceptible to deformation and will unacceptably flex in response to relatively low stress. Non-uniform deformation of the glass elements in a direction perpendicular to the surface of the glass elements of as little as a tenth of a millimeter over a small area (i.e., relatively sharp or sudden deformation) can result in noticeable, measurable, and objectionable distortion of reflections. The noticeability of these deformations will depend upon the sharpness of the deformation, its length and location on the mirror, and numerous other factors, making it difficult to quantify these deformations. However, this does not detract from their significance and, in fact, it adds to the difficulty in dealing with them. Notably, these unacceptable deformations can occur at any time in the EC mirror manufacturing process, and can even occur well after the mirror manufacturing process, such as during assembly of the mirror into a mirror housing or onto a vehicle or during normal "post-assembly" relaxation of components. Deformations can also occur when thermoplastics creep in reaction to relaxation of internal and external stresses and/or when distortion occurs while in service (e.g., due to thermal and other environmental stressors). The problem is compounded in thin glass elements separated by a solution phase EC material, a gel phase EC material, or hybrid thereof, because the front and rear elements do not reinforce each other to provide a rigid "compound" beam strength like they would if they were fixedly secured together.

By way of example, in many exterior EC vehicle mirrors, a double-glass-element EC mirror is adhered to a heater pad, which is in turn adhered to a "flat" support surface of a carrier. In exterior mirrors, a power pack adjustment mechanism for motorized adjustment of the angle of the reflector is attached to the carrier (such as by snap-attachment or other quick-attach mechanical means). The assembly (whether or not it includes a power pack adjustment mechanism) is then operably mounted in a mirror housing, which mirror housing is adapted for attachment to the vehicle.

Problematic deformation to a mirror having flex-sensitive thin glass elements can occur, for example, as a result of imperfections in the carrier support surface. These imperfections telegraph through the heater pad and through the adhesive to the rear glass element. Since the flex-sensitive thin glass elements are not particularly stiff, it is very difficult to assemble the thin glass element onto a supporting assembly without unacceptably deforming it. If the carrier is not exceptionally flat and defect free, then the thin glass elements will likely be distorted optically upon being bonded to the carrier. If the carrier is very weak, then the adhesive itself may deform the rear glass element (i.e., the element having the reflector disposed thereon) as the adhesive cures. Even when the carrier is flat, the adhesive can distort and stress the rear glass element as it is positioned on the carrier, such as by entrapping bubbles of air and/or by stressing and distorting the rear glass element during the attachment/bonding/curing process for the adhesive. Another problem occurs when the weak/flat carrier deforms upon attachment to its support structure, such as when a carrier is attached to a power pack actuator. For example, many power pack adjustment mechanisms are snapped to the carrier, with attachment fingers on the carrier resiliently flexing to receive and grip the power pack. However, the attachment fingers extend from a back surface of the carrier. Flexing the attachment fingers results in torsionally bending and distorting a small area of the support surface on the carrier. This results in a slight ripple or surface change in the support surface. These "slight ripples" read through the heater pad to the rear glass element with little or no smoothing or "dampening" by the heater pad, thus causing distortion in the element having the reflector thereon.

Another problem is that attaching the EC mirror subassembly to its housing and/or attaching the mirror housing to the vehicle can cause significant distortions and considerable transfer of stresses to the mirror elements. Yet another problem is that known processes and designs for supporting mirror glass elements are inherently variable and simply are not tolerant of the myriad variances which occur in processing and assembling all of the components. Imperfections in carriers can come from limitations of and normal process variations caused by standard molding techniques and/or part design. They may include as-molded part problems (e.g., sinks and non-uniformities in the flat support surface resulting from poor part or mold design or that result from poor cooling of the part prior to ejection from the mold) and after-molding part problems (e.g., scratches, creep, and dimensional change to the support surface due to plastic relaxation and/or distortion subsequent to molding of a part).

It was noted above that imperfections in a carrier telegraph through or "read through" the heater pad onto flex-sensitive glass elements. Part of the problem is that the known EC mirrors use an aggressive adhesive to assure secure bonding of their rear glass elements to the carrier. However, the aggressive adhesive results in the rear glass elements being held so tightly to the surface of the carrier, that any defect, depression, or imperfection on the surface reads through to the thin glass element. Further, the heater pad incorporates a closed-cell foam that is resistant to absorbing water. However, the closed-cell foam does not adjust or "flow" to smooth out the effect of protrusions that extend into one side of the foam. Instead, protrusions that impact one side of the foam read through to the opposite side of the foam. This is believed to be due to the fact that the closed-cell "bubbles" in foam sheets now used in mirrors and heater pads tend to move in a direction perpendicular to the sheet of foam rather than to compress, deform, or shift parallel to the foam sheet. Thus, defects on the support surface tend to read through to the glass element causing unacceptable surface distortion in the glass element, unless the glass element is thick enough to resist such distortion.

Another problem comes from thermal-related circumstances. Mirror assemblies undergo thermal expansion and contraction due to environmental temperature changes, both in terms of actual temperature and in terms of the rate of change in temperature. Glass expands/contracts a different amount and at a different rate than other components (e.g., plastic and metal components) of known mirrors, which results in transient, semi-permanent and permanent distortions, non-uniformities, and other problems both during the manufacturing process and also during assembly onto a vehicle and when the vehicle is in service.

Despite the problems with using flex-sensitive thin glass elements in vehicle mirrors, there are many advantages that could result from using thinner glass elements in EC mirrors. EC mirrors include a front glass element that is intended to be substantially transparent and a rear glass element having a reflector on either its front or rear surface. However, the front glass element reflects approximately 4 to 7 percent of the light impinging on it. As a result, EC mirrors will reflect a double image when viewed from an angle, with the double image including a primary image generated by light reflecting off of the reflector and a light ghost image reflected off of a front surface of the front glass element. (For example, see FIGS. 24 and 25.) The double image is only detectable by a human eye, when the distance between the primary image and the reflected image is great enough for the human eye to distinguish two separate images. This distance between the primary image and the ghost image is directly proportional to the thickness of the glass elements (and also of the angle of viewing). Therefore, a very thin front glass element results in a much shorter distance between the surfaces reflecting the primary image and the ghost image. Thus, having a thin front glass element is a very desirable feature, since the tendency to reflect visible ghost images (i.e., the tendency to reflect visible double images) is greatly reduced. Even apart from weight reduction, if the reflector is on the fourth surface, having thin front and rear glass elements greatly reduces these double images.

Accordingly, a mirror having reduced weight and that solves the aforementioned problems, as well as provide the aforementioned advantages, is desired.

SUMMARY OF INVENTION

In one aspect of the present invention, a rearview mirror assembly for vehicles includes an electrochromic (EC) mirror subassembly including a rear element of less than about 1.6 mm and with front and rear surfaces, a reflector associated with one of the front and rear surfaces, and an EC material for controlled dimming of reflections from the reflector. The mirror assembly further includes a carrier having a support surface shaped to closely match the desired shape and surface uniformity of the rear element, and a retainer holding the EC mirror subassembly on the support surface with a distributed retention force that is sufficient to securely hold the rear element to the support surface, but that avoids undesired bending and stressing of the rear element.

In another aspect of the present invention, an EC rearview mirror assembly for vehicles includes an EC mirror subassembly including front and rear elements each having front and rear surfaces, a reflector associated with the rear element, and a seal spacing the front and rear elements apart to define a chamber therebetween, and still further including an EC material in the chamber. The EC material is one of a solute phase EC material, a gel phase EC material, or a hybrid thereof, such that the front and rear elements are to some extent decoupled and independently deformable. The front and rear elements each have a thickness of less than about 1.6 mm, such that the EC mirror subassembly is characteristically low in weight, but sensitive to flexing in a manner causing unacceptable distortion of images reflected by the reflector. The mirror assembly further includes a flat carrier having a support surface constructed to uniformly and co-extensively support the rear element, and a retainer retaining the EC mirror subassembly against the support surface. The retainer characteristically provides a distributed retention force that uniformly applies the retention force without contributing undesirable non-uniform stresses in a thickness direction relative to the front and rear elements of the EC mirror subassembly.

In another aspect of the present invention, a mirror assembly for vehicles includes an EC mirror subassembly including front and rear elements with an EC material therebetween and a reflector associated with the rear element, and a carrier incorporating a PC board. The PC board has a characteristically very flat, defect-free surface on which the rear element is structurally supported.

In yet another aspect of the present invention, a method includes steps of providing an EC mirror subassembly having front and rear elements that are each less than about 1.6 mm thick and characteristically very lightweight, but further having a reflector associated with the rear element, providing a carrier configured to co-extensively support the EC mirror subassembly in a manner preventing the EC mirror subassembly from being stressed and bent in a thickness direction perpendicular to the reflector, and securing the rear element to the carrier in a distortion-free condition.

These and other aspects, objects, and advantages of the present invention will be further understood and appreciated by those skilled in the art by reference to the present specification, claims, and appended drawings.

DESCRIPTION OF DRAWINGS

FIG. 1 is a perspective view of an exterior rearview electrochromic (EC) mirror and housing assembly for vehicles;

FIG. 1A is a schematic cross-sectional view taken through a center of the EC mirror and housing assembly of FIG. 1, generally showing the relationship of various layers and components and illustrating a problem encountered when using a flex-sensitive EC mirror subassembly relative to image distortion;

FIG. 1B is an enlarged cross-sectional view of a distorted area around a root of an attachment finger on the carrier shown in FIG. 1A;

FIG. 2 is a perspective view of an interior rearview EC mirror and housing assembly for vehicles, the general construction of the flex-sensitive EC mirror subassembly being similar to FIG. 1, but absent a power adjustment device and absent a heater pad;

FIG. 2A is a schematic cross-sectional view, generally showing the relationship of various layers and components in the interior mirror and housing assembly of FIG. 2, and illustrating the roblem of using a flex-sensitive EC mirror subassembly relative to image distortion;

FIG. 3 is an exploded perspective view of a first exterior mirror and carrier assembly embodying the present invention, the mirror and carrier assembly including a flat support surface on a carrier for uniformly supporting an EC mirror subassembly having a flex-sensitive rear element, the rear element being abuttingly supported by the flat support surface on the carrier and including a snap-in bezel retainer securing the EC mirror subassembly to the carrier;

FIGS. 4–6 are enlarged front, side, and back views of the EC mirror and carrier assembly shown in FIG. 3;

FIGS. 7–9 are cross-sectional views taken along the lines VII—VII, VIII—VIII, and IX—IX in FIG. 6;

FIGS. 10 and 11 are front and rear plan views of a second carrier for use in a second arrangement for supporting a flex-sensitive EC mirror subassembly, the second carrier being similar to the carrier shown in FIGS. 3–9, but being modified to include a continuous pattern of ribs that extend completely across its "flat" support surface for supporting the flex-sensitive mirror subassembly, the ribs having flat front edges defining a discontinuous but characteristically flat support surface;

FIG. 12 is a fragmentary cross-sectional view taken along line XII—XII in FIG. 11;

FIG. 13 is a fragmentary cross-sectional view of a third carrier similar to FIG. 12, but including ribs on both sides of the carrier;

FIG. 16A is a plan view showing a pattern for the heater traces of FIG. 16;

FIG. 17 is a cross-sectional schematic view of a seventh exterior EC mirror and support assembly including a seventh support arrangement for supporting a flex-sensitive EC mirror subassembly, the seventh arrangement being similar to that of FIG. 17, but including electronic components for control of the EC mirror subassembly on the PC board, the heater traces and the electronic components being on the same side of the PC board;

FIG. 18 is a cross-sectional schematic view of an eighth exterior EC mirror and housing assembly including an eighth support arrangement for supporting a flex-sensitive EC mirror subassembly, the eighth arrangement being similar to that of FIG. 17, but with the heater traces and the electronic components being on opposite sides of the PC board;

FIGS. 18A and 18B are schematic plan views showing opposing sides of the PC board, respectively, including the side having the heater traces thereon and the side having the electronic components thereon;

DETAILED DESCRIPTION OF PREFERRED EMBODIMENTS

Figure 9A:
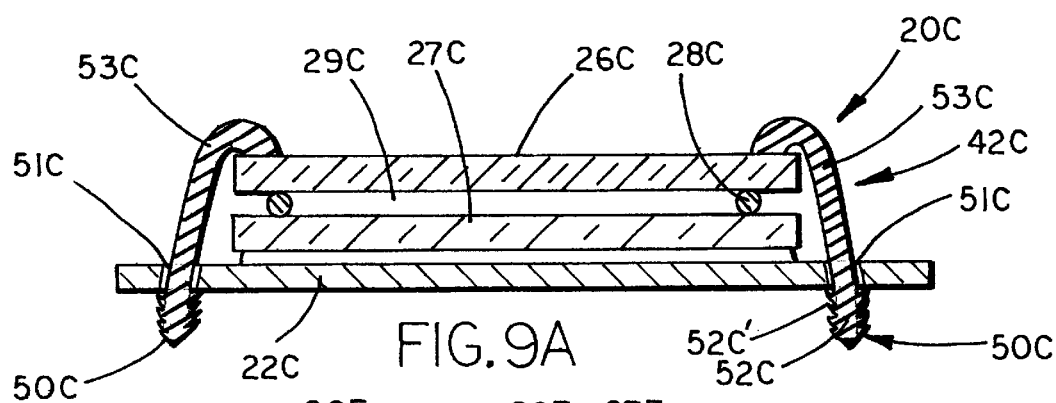
FIG. 9A is a schematic side cross-sectional view showing a modified exterior EC mirror and carrier assembly similar to FIG. 3, but having a modified snap-in retainer mechanism.
Figure 14:
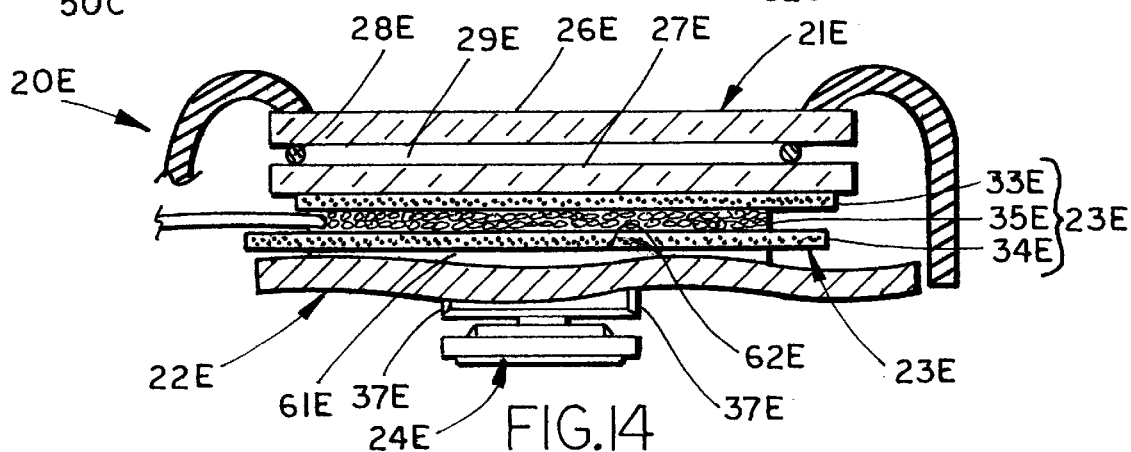
FIG. 14 is a cross-sectional schematic view of a fourth exterior EC mirror and carrier assembly including a fourth support arrangement for supporting a flex-sensitive EC mirror subassembly, including a carrier having a composite material applied to the reflector surface to improve its flatness and stability.
Figure 15:
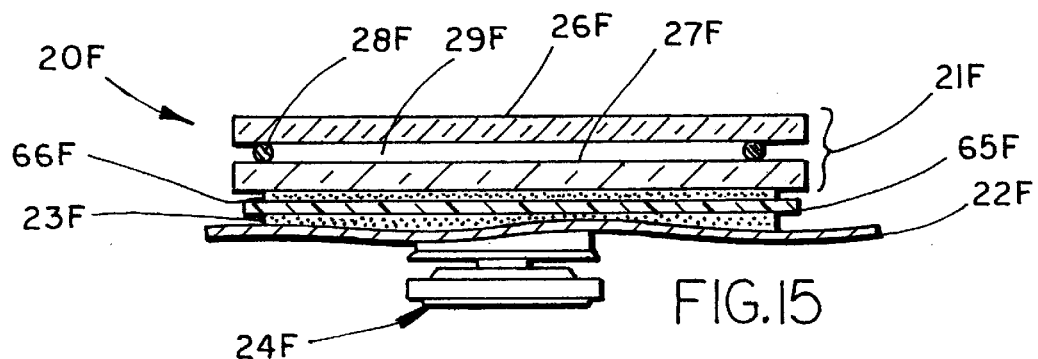
FIG. 15 is a cross-sectional schematic view of a fifth exterior mirror including a fifth support arrangement for supporting a flex-sensitive EC mirror subassembly, including a carrier incorporating a printed circuit (PC) board having a circuit on one (or both) sides, the PC board providing a support surface for the EC mirror subassembly.
Figure 16:
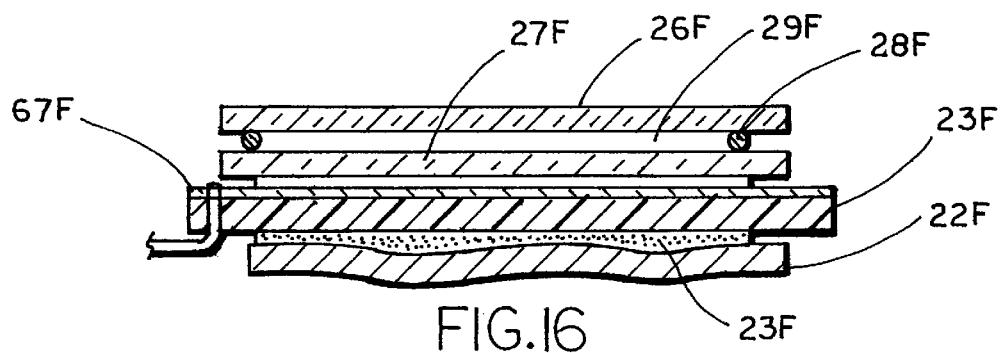
FIG. 16 is a cross-sectional schematic view of a sixth exterior EC mirror and carrier assembly including a sixth support arrangement for supporting a flex-sensitive EC mirror subassembly, including a carrier incorporating a PC board similar to FIG. 15, but including heater traces of resistive conductive material on the PC board that form an integral heater on the PC board.

In order to understand the present invention, it is important to understand the sensitivity of the flex-sensitive electrochromic (EC) mirror subassemblies of the present invention and to understand potential causes of distortion to these flex-sensitive EC mirror subassemblies. This "flex-sensitivity" is illustrated in FIGS. 1–1B and FIGS. 2–2A, and thereafter several structures are shown in FIGS. 3–23 for co-extensively supporting the flex-sensitive mirror subassemblies in a non-distorting manner.

The following discussion will focus primarily on exterior mirrors but, as will be recognized by persons of ordinary skill in this art, the illustrated concepts and embodiments are equally applicable to and useable in interior mirrors as well. In the below discussion, several modified mirrors and support arrangements are shown for accomplishing non-distorting support of a flex-sensitive EC mirror subassembly. In these modified mirrors, the identical or similar elements are described using the same identification numbers, but with the addition of the letters "A," "B," "C," "D," etc. This is for the purpose of reducing redundant discussion only, and it is contemplated that a person of ordinary skill at the time of this invention will understand the broad scope of the various aspects, and further will understand that further arrangements are possible by selectively combining and using various aspects of different ones of the illustrated embodiments.

The illustrated exterior rearview mirror assembly 20 (FIG. 1) includes a front transparent element 26, such as glass, having a front surface 26' (FIG. 1A) and a rear surface 26", and a rear element 27, such as glass, having a front surface 27' and a rear surface 27". For clarity of description of such a structure, the following designations will be used hereinafter. The front surface 26' of the front transparent element 26 will be referred to as the first surface, and the rear surface 26" of the front transparent element 26 as the second surface. The front surface 27' of the rear element 27 will be referred to as the third surface, and the rear surface 27' of the rear element 27 as the fourth surface. A chamber 29 is defined by a layer of transparent conductor (disposed on second surface 26"), and by either another layer of transparent conductor (if the mirror is a fourth surface reflector) or a reflector/electrode (if the mirror is a third surface reflector), and by an inner circumferential wall or sealing member 28.

The material in the chamber 29 is referred to herein as EC material 30. It is contemplated that the scope of the present invention includes solution phase EC material, gel phase EC material, solid phase EC material, and hybrid EC materials. Nonetheless, the present disclosure focuses on the solution phase and gel phase EC materials because these are the most sensitive to flexing, as discussed below. EC materials are well known in the art. For example, see the EC mirror constructions disclosed in U.S. Pat. No. 4,902,108, issued Feb. 20, 1990, to Applicant Harlan J. Byker, entitled *Single-Compartment, Self-Erasing, Solution-Phase Electrochronic Devices, Solutions For Use Therein, And Uses Thereof*; U.S. patent application Ser. No. 08/616,967, filed Mar. 15, 1996, to Applicants William Tonar et al., entitled *Improved Electrochromic Layer and Devices Comprising Same*; and in PCT International Patent application No. PCT/US95/05371, filed Apr. 27, 1995, entitled *Electrochromic Mirrors and Devices*; the entire contents of all three of which are incorporated herein by reference.

The term multi-layer EC mirror subassembly 21 (sometimes shortened to "EC mirror 21" herein) will be used to generally refer to a subassembly that includes front transparent element 26, rear element 27, sealing member 28, and the transparent EC conductor material and/or the reflector/electrode located in the chamber 29. In the present invention, the rear element 27 is glass and is about 0.8 mm to about 1.6 mm thick, and preferably is about 1.0 mm to 1.2 mm thick, and most preferably is about 1.1 mm thick. This makes the rear element 27 sensitive to and susceptible to flexing and deformation to an extent causing unacceptable and objectionable distortion of the reflector associated with the third-surface 27' (or fourth surface 27"), which in turn leads to unacceptable and objectionable distortion of images, as discussed below. The front element 26 is similar in thickness to the rear element 27, although it is contemplated that different thicknesses can be successfully used together.

The illustrated exterior rearview mirror and housing assembly 20 (FIG. 1) includes a multi-layer EC mirror subassembly 21 (FIG. 1A) supported by a carrier 22 and a heater pad 23. The carrier 22 is snap-attached to a power pack 24 that is in turn attached to a mirror housing 25. The housing 25 includes a cantilevered support arm 25' (FIG. 1) and provides cantilevered attachment of the mirror and housing assembly 20 to a vehicle, and further supports the power pack 24 (FIG. 1A) in a manner permitting operation of the power pack 24 to adjust an angle "A" of the flex-sensitive EC mirror 21 by a vehicle driver.

The front and rear elements 26 and 27, when in the range of about 1.6 mm to about 0.8 mm (and more preferably about 1.2 mm to 1.0 mm, and most preferably about 1.1 mm), are sufficiently stiff and rigid to remain flat as long as they are not stressed in a thickness direction perpendicular to their planar bodies. FIG. 1A, at the left side thereof, illustrates the problem of image distortion that occurs if the rear element 27 is attached to a conventional carrier 22 by conventional attachment methods and configurations known in prior art. In regard to EC mirror subassembly 21 (FIG. 1A), the illustrated carrier 22 includes a base plate with a relatively flat surface 36, and further includes a pair of resilient fingers 37 that extend from a back side of the base plate 32 on an opposite side of the flat surface 36. The fingers 37 are configured to snap attach to and frictionally retain the power pack 24 to the carrier 22. By electrically operating the power pack 24, threaded actuators of the power pack 24 are operated to adjustably change the orientation of the carrier 22, thus changing the angle of reflection and optimizing the area being viewed by a vehicle driver. However, fingers 37 that are sufficiently strong to create a secure connection are also strong enough to potentially deform the flat surface 36, as shown on the left of FIG. 1. Specifically, when resilient fingers 37 are snapped onto the power pack 24, the fingers 37 can flex in a manner causing the carrier 22 to distort locally at the base of the fingers 37 at location 38.

The conventional heater pad 23 (FIG. 1B) does not alleviate this problem. Specifically, the illustrated conventional heater pad 23 includes aggressive adhesive layers 33 and 34 on opposite sides of a closed-cell foam sheet 35. The front adhesive layer 33 strongly adheres to the rear surface of the rear element 27, and the rear adhesive layer 34 strongly adheres to the flat surface 36 on the base plate 32 of the carrier 22, so that they durably hold the EC mirror 21 to the flat surface 36 despite a harsh environment of thermal stresses from temperature extremes, rapid temperature changes, and high stresses caused by differences in thermal expansion and contraction. The closed-cell foam sheet 35 insulates the EC mirror 21 (i.e., the rear element 27) from the carrier 22, with the closed cells preventing unacceptable moisture absorption transfer or holding of moisture. The foam sheet 35 also reduces thermal stresses from dimensional differences between the EC mirror 21 and the carrier 22. Dimensional differences can be caused by rapid temperature changes, extreme temperatures, creep, and/or distortion of parts encountered during assembly of the mirror or conditions in the environment. However, the distortion of the flat surface 36 at location 38 reads through the conventional heater pad 23 onto the rear element 27, causing unacceptable distortion of the reflected image. The unacceptable distortion is schematically shown by the three parallel lines of light 39 representing an image. Upon striking the distorted location 38, the three parallel lines 39 are reflected along non-parallel reflected light lines 40. This translates into a distorted reflected image. Adhesive layers 33 and 34 are very aggressive in order to pass durability requirements of mirrors, such that they do not give or stretch. Accordingly, they are unforgiving and do not tend to release or yield in a manner that "smoothes out" the result of protrusions sticking into one side of the heater pad 23.

While not wanting to be limited to any specific theory, it is presently believed that when a protrusion is pressed into one side of the foam sheet 35, the closed cells (see FIG. 1B) of the foam sheet 35 push each other like a series of interconnected chambers, each maintaining their volume and general shape. The interconnected closed cells undergo very little collapse or deformation, but instead undergo significant movement in a direction perpendicular to the sheet in the thickness direction, which is the direction of least resistance, with each succeeding closed cell pushing other closed cells primarily along the perpendicular direction. Very little deformation or collapse of the individual closed cells occurs, with the result that protrusions or defects on one side of the foam sheet 35 read through to the other side. Thus, the closed-cell foam sheet 35 also does not provide forgiving structure. As a result, most glass elements of existing prior art EC mirrors have a glass element thickness of at least about 2.2 mm, so that the problem of distortion illustrated in FIGS. 1A and 2A does not occur to an objectionable level.

The interior rearview mirror and housing assembly 20A (FIGS. 2 and 2A) is not unlike the exterior rearview mirror and housing assembly 20 discussed in FIGS. 1 and 1A. The illustrated interior rearview mirror and housing assembly 20A has a horizontally elongated shape and notably does not include a power pack 24 or heater pad 23. Specifically, the illustrated interior rearview mirror and housing assembly 20A includes an EC mirror 21A attached to a carrier 22A in the housing 25A by strips or patches of conventional double-sided adhesive foam 23A. The EC mirror 21A has front and rear elements 26A and 27A, and a seal 28A that spaces the front and rear elements 26A and 27A apart and that extends around the chamber 29A. EC material 30A (e.g., solute phase, solid phase, or gel phase EC material, or a hybrid thereof) is located in the chamber 29A. The illustrated EC mirror 21A is supported by a flat surface having a surface defect at location 38A. This reads through the foam layer 23A (for reasons discussed below) to the rear element 27A, causing a distortion of the flex-sensitive rear element 27A. As illustrated, the parallel light lines 39A representing an image are reflected from a third surface reflector along non-parallel light lines 40A, causing a distorted image. The same effect can happen with a fourth surface reflector. Notably, the housing 25A is supported in cantilever to a vehicle front window by an arm 25A' that is attached to a retainer adhered to the front window, such that the interior mirror and housing assembly 20 is subject to vibration problems, as discussed above.

A mathematical formula has been derived that identifies rearview mirrors with front and rear elements having enough internal stiffness and strength to be "distortion proof" or "distortion resistant" (i.e., stiff enough to prevent bending resulting in unacceptable image distortion). In basic engineering, it is recognized that the "beam" strength or stiffness of materials varies by a square of its thickness. Also in mirrors, the larger the diagonal or "long" dimension L, the less tendency there is for a user to object to small or localized defects causing distortion. The reason for this appears to be related to the size of the reflected image (i.e., in large objects, there is less need for visual attention to small areas and detail) and is further related to the distance of the user from the glass element (i.e., if the reflected image is large, the user does not need to be as close to the mirror to be able to use it). The formula: $L/T^2 > 75/mm$ generally defines acceptable front or rear elements, where "L" equals a longest dimension across the element, and "T" equals the thickness of the element (see FIG. 3). For example, $L/T^2 =$ about 75/mm for an exterior rearview mirror assembly 20 that has a rear element 27 with a long (diagonal) dimension of 254 mm and a glass thickness of 1.8 mm. Also, $L/T^2 =$ about 100/mm where the long dimension is 254 mm and T=about 1.6 mm. Mirror elements having a larger long dimension L or a reduced thickness T have a larger calculated value and, therefore, are included in the present invention based on this formula. Prior art rearview mirrors typically have a greater thickness, which results in much lower values for $L/T^2$. For example, a prior art EC mirror subassembly having an element with a similar long dimension L=254 mm and but a large thickness of T=2.2 mm, result in a value $L/T^2$=about 52/mm. Thus, this equation, when used to define the present invention, excludes the prior art element having a thickness of 2.2 mm. It is also noted that the low weight of the thin elements results in a surprising and unexpectedly low total weight. For example, a weight of an EC mirror subassembly 21 using 1.6 mm glass elements is about 25 percent lower in weight than a similarly sized EC mirror subassembly 21 using 2.2 mm glass. Concurrently, where the EC mirror subassembly 21 (or 21A) has an element 27 (or 27A) thickness of 1.1 mm, a weight savings of about 50 percent results.

An EC mirror subassembly 21B (FIG. 3) includes a rear element 27B retained to a carrier 22B by an attachment configuration that optimally co-extensively supports the rear element 27B for minimal image distortion. The EC mirror 21B includes a front element 26B separated from rear element 27B by a seal 28B. A pair of clips 31B extends along top and bottom edges of the front and rear elements 26B and 27B inside the seal 28B. The clips 31B are optimally positioned to be in electrical contact with a layer of transparent conductor(s) and/or reflector electrode, which in turn is in contact with the EC material 30B to provide an evenly distributed electrical voltage potential across the EC material 30B. A heater pad 23B mechanically/physically supports the rear element 27B on a flat surface 36B of the base plate 32B, but the heater pad 23B characteristically does not adhere the rear element 27B to the carrier 22B. (In other words, at least one of the adhesive layers 33 and 34 is absent.) Instead, the EC mirror 21B (and the heater pad 23B) is held against the flat surface 36B on the base plate 32B of the carrier 22B by a perimeter bezel 42B that mechanically snap attaches to an edge of the base plate 32B. Specifically, the perimeter bezel 42B includes a front flange 43B that abuts against a front surface of the front element 26B. The bezel 42B includes a wrap-around section 44B that extends around the EC mirror 21B and that provides an aesthetic trimmed look. The bezel 42B further includes a rearwardly extending rear flange 45B (FIG. 7) having a thin cross-sectional dimension, and further having a plurality of apertures 46B (FIG. 9). The base plate 32B includes a forwardly extending flange 47B having inwardly extending barbs or hooks 48B positioned to engage the apertures 46B.

As illustrated in FIG. 4, the perimeter bezel 42B can be geometrically non-symmetrical and non-uniform in plan view. The illustrated perimeter bezel 42B has a plurality of regularly spaced barbs 48B (FIG. 6) and apertures 46B, but it is contemplated that the present invention includes arrangements having non-uniformly spaced barbs and apertures optimally positioned for distributing stress. Notably, the front and rear elements 26B and 27B are compressed only along their perimeter, where they are substantially fully supported by the seal 28B (FIG. 7) and where any deflection in the thin elements is least noticeable (and further where perimeter bezel 42B covers any deflection). The front and rear elements 26B and 27B are flexible, but are semi-rigid and sufficiently stiff to resist minor stresses distributed widely across a center area of their planar bodies. Notably, there is clearance 49B between the bezel 42B and the edge of the elements 26B and 27B, which allows the EC mirror subassembly 21B to float a small amount, which further reduces stress on the EC mirror subassembly 21B.

FIG. 9A illustrates a rearview EC mirror subassembly 21C similar to the mirror 21B shown in FIGS. 3–9, but EC mirror 21C has a modified snap-in perimeter bezel 42C having barbed bayonet-type connectors 50C shaped to snappingly engage forwardly facing apertures 51C in the carrier 22C, with the connectors 50C being shaped for secure connection despite different depths of engagement. The connectors 50C have an enlarged end 52C with side fins 52C' shaped for one-way engagement with the apertures 51C. The bayonet-type connectors 50C further have curved lengths 53C that are shaped to flex toward a straight "longer" shape, thus assuring that the enlarged ends 52C can be fully extended into and secured in the apertures 51C at a desired tension. After insertion of the enlarged ends 52C, the lengths 53C resiliently bend back toward the curved "shorter" shape, thus creating a spring-like action that eliminates any depth-related looseness problems. It is contemplated that other means of retention could be used other than snap attachment. For example, the bayonet-type connectors could include an end that is heat staked, thermally formed, mechanically or chemically secured, or otherwise secured to the carrier.

The carrier 22D (FIGS. 10 and 11) includes a continuous pattern of ribs 55D formed completely across a front side of the carrier 22D, including across the opening 56D that is commonly formed in a center of the illustrated mirror carrier. Specifically, attachment tabs 57D are formed around the opening 56D for engaging mating flanges on the power pack 24D for power adjustment of the EC mirror subassembly 21D. The opening 56D facilitates the molding process for forming the tabs 57D. These attachment tabs 57D inherently lead to slight non-uniformities in the mirror-element-supporting front surface of the carrier 22D, due to the way that they affect the flow of polymeric material into the carrier 22D and due to non-uniform cooling of the part and other factors known in the art of molding plastic parts. Further, stresses induced when the power pack 24D is attached to the carrier 22D cause further material disruptions, distortions, and non-uniformities. The existence of the continuous pattern of ribs 55D can help reduce or eliminate these uniformities. Further, the ribs 55D (FIG. 12) provide a stable mirror-supporting surface 58D, while creating open areas 59D that allow the ribs to flex. Also, the many open areas 59D create pockets, such that protrusions extending in a direction perpendicular to the mirror-supporting surface 58D do not read through to the rear element 27D. Notably, the support surfaces 58D of the ribs 55D define a flat plane so as to provide good support to the rear element 27D, and the ribs 55D are positioned close enough together to provide adequate support for the EC mirror 21D. Concurrently, the rear element 27D has a thickness sufficient to allow it to support itself laterally across the open areas 59D without objectionable distortion. Notably, the ribs 55D can be positioned on a front side of the carrier 22D (see FIG. 12) or can be positioned on a rear side of the carrier (not specifically shown), or can be positioned on both sides (see FIG. 13).

The mirror assembly 20E (FIG. 14) includes a carrier 22E that is similar to the base carrier 22 (FIG. 1A) in that carrier 22E has a non-uniform non-flat front surface 60E. However, carrier 22E further includes an in-mold coating 61E having "flattening" characteristics, such that the front surface 62E is characteristically very flat. In-mold coating uses a process where, after a part is molded, the dies are opened slightly and additional material is injected onto (i.e., molded onto) its primary surface. The in-mold coating 61E fills voids and sinks so as to create a defect-free "ultra-flat" surface. Such in-mold coating material is known in the art and has been used in front-end panels on GM vehicles, for example, to reduce surface defects. The heater pad 23E adheres the EC mirror 21E to the flat front surface 62E by attachment methods known in the art. It is contemplated that the "very flat" front surface 62E can be accomplished by various means, in-mold coating being only one method. Other ways include re-molding or double-strike molding (where a part is molded and then the pressure on the semi-molten injected plastic is increased to "flatten" the molten plastic as it cools and solidifies), and two-shot molding (where a second charge of potentially or different plastic is injected onto the carrier surface). Also, ultra-flat surfaces can be made by attaching a flat sheet of metal or other material to the carrier or by machining or other post-molding treatment. Flatness of the carrier can also be greatly improved through use of optimal polymeric molding materials and fillers, such as high-flow material with a relatively sharp melting point (making it easy to mold in a stress-free state), or by use of low shrink materials, such as high-filler-containing materials. Specifically, it is contemplated that carriers 22D can be molded from high-flow polymeric materials, such as polycarbonate, nylon, thixotropic polyolefins, and similar structural polymers; or that reinforced polymers can be used, such as glass-fiber filled, micro-spherical glass filled, graphite-fiber filled, and/or mineral-filled reinforced polymers, with good success. Optimal molding techniques are preferred that promote maximum flatness of a front face of carrier 22D.

The chip manufacturing industry has developed technologies for providing PC boards and computer discs (CDs) that are characteristically very flat, which is a highly desirable feature that can be advantageously used in the present invention. Flatness specifications for PC boards are widely available in the industry and can be obtained from manufacturers. The flatness will vary depending on the thickness and grade/quality of the purchased PC board. For example, at least one PC board manufacturer markets a commercial and quality grade PC board having a thickness of 0.63 to 0.125 inches, where the uncut PC board stock has a percentage warp and twist of less than 2.5 percent, with a warp over a 36-inch length of PC board stock of less than 0.900 inches, and a warp over a 48-inch length of PC board stock of less than 1.200 inches. Also, this same manufacturer markets a commercial and quality grade PC board having a thickness of 0.031 to 0.062 inches, where the PC board has a percentage warp and twist of less than 5.0 percent, with a warp over a 36-inch length of less than 1.800 inches, and a warp over a 48-inch length of less than 2.400 inches. Either of these PC boards can be used, depending on the stiffness of PC board required in a given application. Specifically, carrier 22F (FIG. 15) incorporates a PC board 65F adhered to the carrier 22F by a sticky double-sided heater pad 23F. The rear element 27F is adhered to a front of the PC board 65F by adhesive 66F. Notably, the position of the heater pad 23F and the PC board 65F can be reversed if faster heating of the EC mirror subassembly 21F is desired. Advantageously, the PC board 65F becomes an integral part of the mirror system. This allows components to be put onto the PC board and directly connected to the EC mirror 21F. For example, heater traces 67F can be traced or placed onto the PC board 65F (FIGS. 16 and 16A), or electronic components 68F can be incorporated into circuits on the PC board 65F for control of the EC mirror 21F (FIG. 17), or both heater and electronic components can be incorporated onto a single PC board 65F (FIGS. 18 and 18B). MID technology can also be used on two-shot molding processes, along with photolithic processes, instead of standard PC board processes, to create integral circuits on the support carrier 22F.

Figure 19:
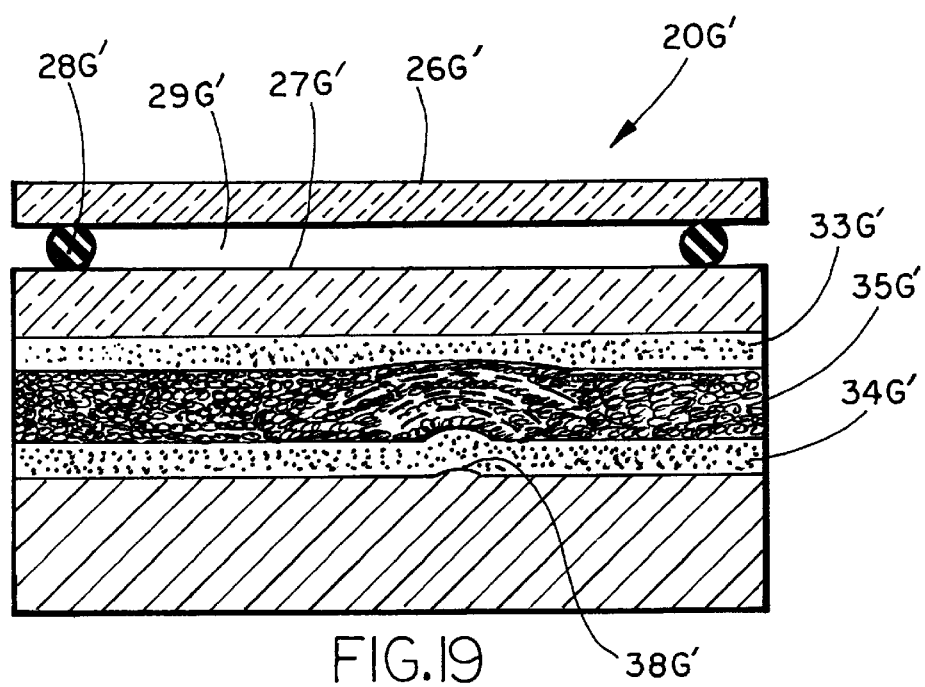
FIG. 19 is a cross-sectional schematic view of a ninth exterior EC mirror and carrier assembly including a ninth support arrangement for supporting a flex-sensitive EC mirror subassembly, including a thicker "gooier" adhesive layer that provides less read through of defects to the flex-sensitive EC mirror subassembly.
Figure 20:
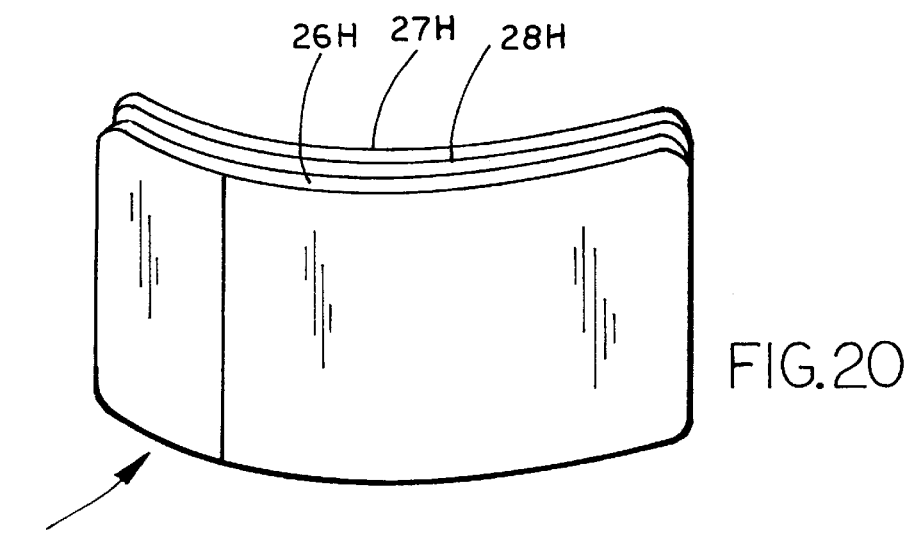
FIG. 20 is a perspective view of a flex-sensitive EC mirror subassembly that is aspheric in shape and that has a non-flat surface reflector.
Figure 21:
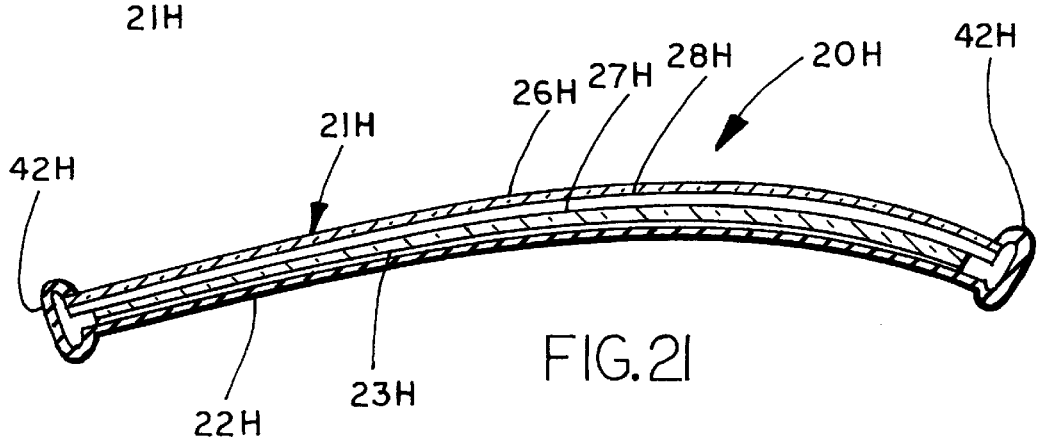
FIG. 21 is a cross-sectional schematic view of a tenth exterior EC mirror and carrier assembly including a tenth support arrangement for supporting the aspheric flex-sensitive EC mirror subassembly shown in FIG. 20, the tenth arrangement incorporating a snap-in bezel retainer similar to that shown in FIGS. 7–9.
Figure 22:
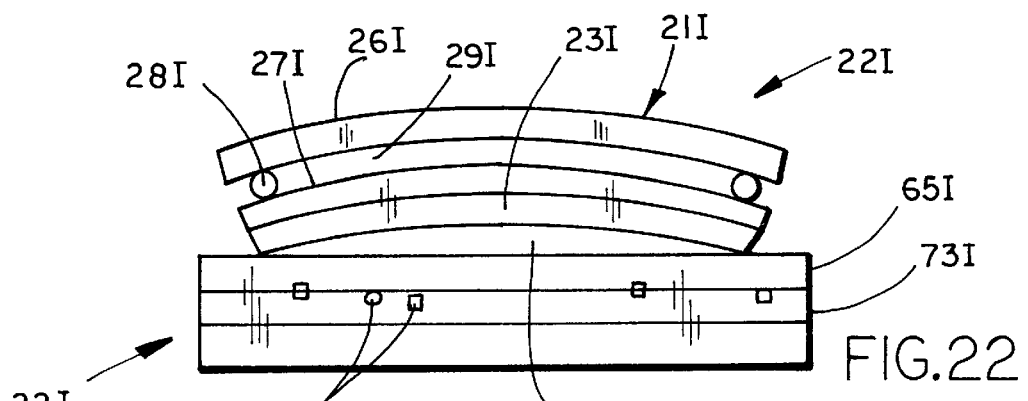
FIG. 22 is a cross-sectional schematic view of an eleventh exterior EC mirror and carrier assembly including an eleventh support arrangement for supporting the aspheric flex-sensitive EC mirror subassembly shown in FIG. 20, including a carrier incorporating a PC board in a manner where the PC board comprises the carrier and wherein material is insert molded onto the PC board to form a contoured support surface that closely replicates a rear shape of the aspheric rear element.
Figure 23:
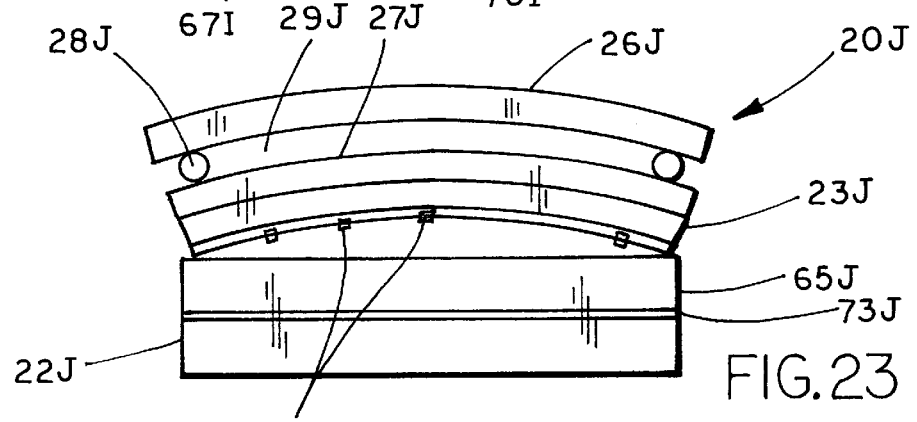
FIG. 23 is a cross-sectional schematic view of a twelfth exterior EC mirror and carrier assembly including a twelfth support arrangement for supporting the aspheric flex-sensitive EC mirror subassembly shown in FIG. 20, the twelfth arrangement including a carrier with an integral circuit formed thereon by photolithic or other process, the carrier utilizing molded interconnect device (MID) technology to provide mirror control.

Yet another alternative is to use an arrangement similar to the arrangement of mirror assembly 20 (FIG. 1A), but to modify the heater pad 23 to be more forgiving. Specifically, the modified heater pad 23G (FIG. 19) includes modified adhesive layers 33G and 34G and/or a modified foam layer 35G. In the modified adhesive layers 33G and 34G, the adhesive is formulated to be much less aggressive and stiff/rigid than in prior art, but instead is made to be much "gooier" and stickier and hence more flexible and forgiving. Technologies for making adhesives gooier and stickier are well known in the art of adhesives and need not be described herein for an understanding of the present invention. It is noted that the properties of a particular adhesive will be closely related to functional requirements of a particular mirror application. This added "gooiness" allows the adhesive to forgive surface imperfections by stretching or absorbing small protrusions and surface defects to blend away localized imperfections. Yet the resiliency and toughness of this arrangement allows the adhesive to securely retain the EC mirror subassembly 21G securely to the carrier 22G in a manner that does not cause failure by peeling away from the carrier or the reflector over time while in service, particularly in view of the present lightweight EC mirror subassemblies disclosed herein. Notably, the reduction in weight of the present EC mirror subassemblies allows the adhesive to be made less aggressive while still providing adequate retention strength. Consistent with this, the foam 35G is made to include foam cells that are at least in part open cells. This allows air to shift between foam cells, allowing the foam to absorb surface imperfections and to not have such a strong read through of surface imperfections. It is noted that closed-cell foam is preferred in the prior art since it does not absorb moisture like open-cell foams. FIG. 19 illustrates the effectiveness of an interior mirror assembly 20G' with a gooey thick adhesive layer 34G and an open-cell foam 35G. As can be seen, the protrusion at location 38G' is smoothed out by gooey adhesive layers 33G' and 34G' and by the open-cell foam layer 35G'. Moisture absorption can be a problem since water can soak into open cells, freeze to cause delamination, create electrical problems, and/or create other problems in mirrors having open-cell foam, particularly in exterior mirrors, thus causing field failures and warranty. However, it is contemplated that resistance to water and moisture absorption can be solved by other means, such as by moisture barrier films, surface treatments that resist or repel moisture, and/or by use of mirror components that cause moisture to be funneled away or held away from problem areas.

The mirror and carrier assembly 20H (FIGS. 20 and 21) includes non-flat aspherically shaped EC mirror subassembly 21H having aspherical front and rear elements 26H and 27H. Aspheric mirrors are popular in some European countries because they provide an advantage in that the reflected image can be designed to capture a large viewing area, even where the surface area of the mirror is smaller than the viewing area that the manufacturer wants the driver to be able to see. Aspheric EC mirror subassembly 21H is also advantageous in that the curvature of the glass results in front and rear elements 26H and 27H that are inherently resistive to localized undesired distortion. This is because of structural stiffness properties that result from a curvilinear surface. This allows the front and rear elements 26H and 27H to be made even thinner, while still maintaining the necessary resistance to image distortion desired. Mirror elements having a thinness of as little as 0.8 mm are contemplated, although a thickness of about 1.1 mm is contemplated to be optimal. The illustrated mirror assembly 20H includes a snap-in bezel 42H that snap attaches to the carrier 22H (see FIG. 3).

The carrier 22I (FIG. 22) includes an aspherically shaped front surface formed by material 70I molded onto a PC board 65I. Circuitry 67I and/or a heater are formed on or under the PC board 65I and on or under the molded-on material 70I. The EC mirror subassembly 21I is adhered to the molded-on material 70I, such as by a heater pad 23I that attaches to rear element 27I. Filler adhesive material 73I holds the PC board 65I onto the carrier 22I.

The mirror and carrier assembly 20J (FIG. 23) includes MID technology that is used on two-shot molding processes, along with photolithic processes (instead of "standard" PC board processes) to create integral circuits 67J on the support carrier. The MID technology allows circuits and devices for circuits to be placed onto three-dimensional surfaces, at relatively low cost.

Figure 24:
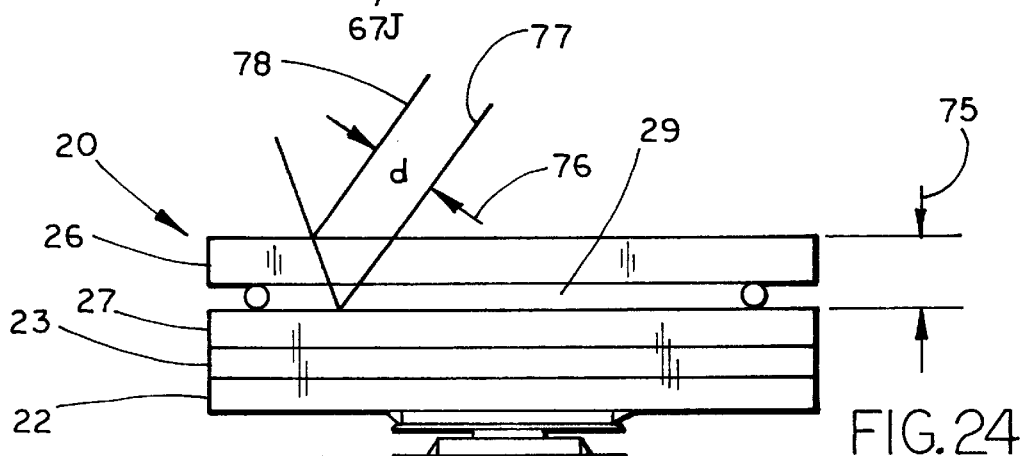
FIGS. 24 and 25 are schematic cross-sectional views, FIG. 24 showing an EC mirror subassembly having "thicker" front and rear elements and FIG. 25 showing the reduction in "ghosting" caused in reflection of double images when using the present flex-sensitive EC mirror subassembly having a "thinner" front element.
Figure 25:
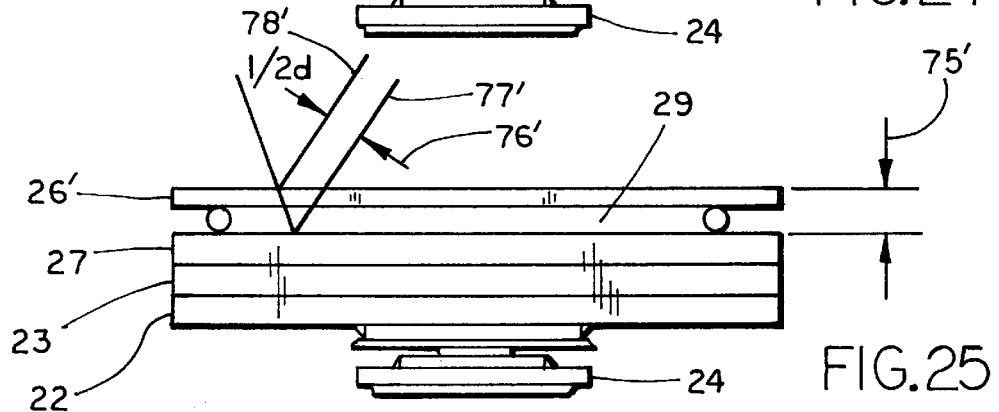

FIGS. 24 and 25 show EC mirror subassemblies having a third surface reflector and illustrate the reduction in ghosting that results from use of a mirror 80' having a thinner front if transparent element 26' (FIG. 25) compared to a mirror 80 having a thicker front element 26 (FIG. 24). With a greater distance 75 between the front surface of the front element 26 and the front surface of the rear element 27, a greater reflected variance distance 76 occurs between the primary reflected image 77 and the secondary reflected image 78. When the variance distance 76 is great enough and when the viewing angle is sufficient, a person sees a double image. This is referred to as ghosting. As is shown in FIG. 25, the reflected variance distance 76' is much less than the variance distance 76 in FIG. 24 because of the reduced distance 75' in FIG. 25. Concurrently, the primary reflected image 77' is closer to the secondary reflected image 78'. It will be clear to a person of ordinary skill that in EC mirror subassemblies having a fourth surface reflector, the thickness of the rear element also directly reduces the problem of ghosting.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A rearview mirror assembly for vehicles comprising:
an electrochromic (EC) mirror subassembly including a rear element of less than about 1.6 mm and with front and rear surfaces, a reflector associated with one of the front and rear surfaces, and an EC material for controlled dimming of reflections from the reflector;
a carrier having a support surface shaped to closely match the desired shape and surface uniformity of the rear element;
a retainer holding the EC mirror subassembly on the support surface with a distributed retention force that is sufficient to securely hold the rear element to the support surface, but that avoids undesired bending and stressing of the rear element; and
wherein the EC mirror subassembly includes a front element that is less than about 1.6 mm thick, and wherein the front and rear elements each have a long dimension and a thickness satisfying the equation $L/T^2>75$/mm. where L=a long dimension across the rear element, and where T=a thickness of a thickest one of the front and rear elements.

2. The rearview mirror assembly defined in claim 1, wherein the EC mirror subassembly includes a seal between the first and second elements that defines a chamber between the first and second elements, with the EC material located in the chamber.

3. The rearview mirror assembly defined in claim 2, wherein the EC material is located in the chamber and is at least partially solution phase.

4. The rearview mirror assembly defined in claim 3, wherein at least one of the front and rear elements comprises a thin sheet of glass having a thickness of less than about 1.2 mm.

5. The rearview mirror assembly defined in claim 4, wherein both of the front and rear elements comprise a thin sheet of glass having a thickness of less than about 1.2 mm.

6. The rearview mirror assembly defined in claim 5, wherein both of the front and rear elements comprise a thin sheet of glass having a thickness of less than about 1.1 mm.

7. The rearview mirror assembly defined in claim 1, wherein at least one of the front and rear elements comprises a thin sheet of glass having a thickness of less than about 1.1 mm.

8. The rearview mirror assembly defined in claim 1, wherein the retainer comprises a mechanical attachment arrangement that attaches around a perimeter of the EC mirror subassembly and that presses the EC mirror subassembly to the carrier.

9. The rearview mirror assembly defined in claim 8, wherein the retainer provides a mechanical attachment that is characteristically the sole attachment of the EC mirror subassembly to the carrier.

10. The rearview mirror assembly defined in claim 1, wherein the carrier includes a matrix of interconnected ribs, the matrix extending completely across the carrier to rigidify the support surface.

11. The rearview mirror assembly defined in claim 1, wherein the carrier comprises a molded polymeric component, with the support surface being formed by a flat-surface-forming second material covering a portion of the molded polymeric component.

12. The rearview mirror assembly defined in claim 1, wherein the carrier includes a PC board forming a structural part of the carrier.

13. The rearview mirror assembly defined in claim 12, wherein the PC board has a circuit printed thereon, and including devices operably connected to the circuit for controlling dimming of the EC material.

14. The rearview mirror assembly defined in claim 12, wherein the PC board has a flat surface forming the support surface that faces the rear element and that is characteristically flat and defect free.

15. The rearview mirror assembly defined in claim 12, including secondary material applied to the PC board to form the support surface.

16. The rearview mirror assembly defined in claim 12, wherein the carrier comprises a PC board providing the support surface, and including a heater pad applied to a side of the PC board.

17. The rearview mirror assembly defined in claim 16, including a circuit printed onto the PC board for controlling heating of the heater pad.

18. The rearview mirror assembly defined in claim 1, including a heater pad including a first adhesive adhered to the support surface and a second adhesive adhered to the rear element, the retainer including the first and second adhesives, at least one of the first and second adhesives being tough and not brittle, whereby the stiffness of the rear element overcomes any stress-induced forces of the one adhesive when the one adhesive is cured and aged, such that the rear element remains flat and undistorted.

19. The rearview mirror assembly defined in claim 1, wherein the rear element has a planar shape.

20. The rearview mirror assembly defined in claim 1, wherein the rear element has a non-planar shape.

21. The rearview mirror assembly defined in claim 20, wherein the rear element has an aspheric shape, such that the reflector is non-planar, causing the reflected images to be reflected in a predetermined changed way.

22. The rearview mirror assembly defined in claim 21, wherein the EC material includes a solution phase EC material.

23. The rearview mirror assembly defined in claim 21, wherein one of the front and rear elements comprises a thin sheet of glass having a thickness of less than about 1.1 mm.

24. The rearview mirror assembly defined in claim 23, wherein each of the front and rear elements comprise a thin sheet of glass having a thickness of less than about 0.8 mm.

25. A rearview mirror assembly for vehicles comprising:
an electrochromic (EC) mirror subassembly including a rear element of less than about 1.6 mm and with front and rear surfaces, a reflector associated with one of the front and rear surfaces, and an EC material for controlled dimming of reflections from the reflectors;
a carrier having a support surface shaped to closely match the desired shape and surface uniformity of the rear element; and a retainer holding the EC mirror subassembly on the support surface with a distributed retention force that is sufficient to securely hold the rear element to the support surface, but that avoids undesired bending and stressing of the rear element;

wherein the retainer comprises a mechanical attachment arrangement that attaches around a perimeter of the EC mirror subassembly and that presses the EC mirror subassembly to the carrier; and wherein the EC mirror subassembly includes a front element that is less than about 1.6 mm thick, wherein one of the retainer and the carrier includes apertures, and the other of the retainer and the carrier includes snap-engaging connectors that resiliently frictionally engage the apertures to secure the retainer against the front element.

26. A rearview mirror assembly for vehicles comprising:

an electrochromic (EC) mirror subassembly including a rear element of less than about 1.6 mm and with front and rear surfaces, a reflector associated with one of the front and rear surfaces, and an EC material for controlled dimming of reflections from the reflector;

a carrier having a support surface shaped to closely match the desired shape and surface uniformity of the rear element;

a retainer holding the EC mirror subassembly on the support surface with a distributed retention force that is sufficient to securely hold the rear element to the support surface, but that avoids undesired bending and stressing of the rear element;

wherein the carrier includes a matrix of interconnected ribs, the matrix extending completely across the carrier to rigidify the support surface; and wherein some of the interconnected ribs are formed on a front face of the carrier and form the support surface.

27. The rearview mirror assembly defined in claim 26, wherein the carrier includes a large central opening with attachment flanges formed around a perimeter of the central opening, the attachment flanges being shaped to receivingly securely engage a power pack capable of adjusting an angle of the EC mirror subassembly, the ribs extending across the large central opening.

28. The rearview mirror assembly defined in claim 27, including a power pack attached to the attachment flanges and a mirror housing attached to the power pack, the power pack being a self-contained unit adapted to adjust an angle of the EC mirror subassembly and the carrier as a unit relative to the mirror housing.

29. A rearview mirror assembly for vehicles comprising:

an electrochromic (EC) mirror subassembly including a rear element of less than about 1.6 mm and with front and rear surfaces, a reflector associated with one of the front and rear surfaces, and an EC material for controlled dimming of reflections from the reflector;

a carrier having a support surface shaped to closely match the desired shape and surface uniformity of the rear element;

a retainer holding the EC mirror subassembly on the support surface with a distributed retention force that is sufficient to securely hold the rear element to the support surface, but that avoids undesired bending and stressing of the rear element;

wherein the EC mirror subassembly includes a front element that is less than about 1.6 mm thick, wherein the carrier comprises a molded polymeric component, with the support surface being formed by a flat-surface-forming second material covering a portion of the molded polymeric component; and wherein the flat-surface-forming second material is applied by in-mold coating processes and comprises a molded-on coating material.

30. A rearview mirror assembly for vehicles comprising:

an electrochromic (EC) mirror subassembly including a rear element of less than about 1.6 mm and with front and rear surfaces, a reflector associated with one of the front and rear surfaces, and an EC material for controlled dimming of reflections from the reflector;

a carrier having a support surface shaped to closely match the desired shape and surface uniformity of the rear element;

a retainer holding the EC mirror subassembly on the support surface with a distributed retention force that is sufficient to securely hold the rear element to the support surface, but that avoids undesired bending and stressing of the rear element, wherein the EC mirror subassembly includes a front element that is less than about 1.6 mm thick;

wherein the rear element has an aspheric shape, such that the reflector is non-planar, causing the reflected images to be reflected in a predetermined changed way; and wherein the front and rear elements each have a thickness and area satisfying the equation of $L/T^2>100$/mm, where L=a long dimension across one of the front and rear mirror elements, and where T=a thickness of a thickest one of the front and rear elements.

31. An EC rearview mirror assembly for vehicles comprising:

an EC mirror subassembly including front and rear elements each having front and rear surfaces, a reflector associated with the rear element, and a seal spacing the front and rear elements apart to define a chamber therebetween, and still further including an EC material in the chamber, the EC material being one of a solute phase EC material, a gel phase EC material, or a hybrid EC material including one of same, such that the front and rear elements are to some extent decoupled and independently deformable, the front and rear elements each having a thickness of less than about 1.6 mm, such that the EC mirror subassembly is characteristically low in weight but sensitive to flexing in a manner causing unacceptable distortion of images reflected by the reflector, and wherein the front and rear elements each have a long dimension and a thickness satisfying the equation $L/T^2>75$/mm, where L=a long dimension across the rear element, and where T=a thickness of a thickest one of the front and rear elements;

a carrier having a flat support surface constructed to uniformly and co-extensively support the rear element; and a retainer retaining the EC mirror subassembly against the support surface, the retainer characteristically providing a distributed retention force that uniformly applies the retention force without contributing undesirable non-uniform stresses in a thickness direction relative to the front and rear elements of the EC mirror subassembly.

32. A mirror assembly for vehicles comprising:

an EC mirror subassembly including front and rear elements with an EC material therebetween and a reflector associated with the rear element;

a carrier structurally incorporating a PC board, the PC board having a characteristically very flat, defect-free surface on which the rear element is structurally supported; and wherein the front element is less than about 1.6 mm thick, and wherein the front and rear elements each have a long dimension and a thickness satisfying the equation $L/T^2 > 75/mm$, where L=a long dimension across the rear element, and where T=a thickness of a thickest one of the front and rear elements.

33. A mirror assembly for vehicles comprising:

an EC mirror subassembly including front and rear elements with an EC material therebetween and a reflector associated with the rear element;

a carrier structurally incorporating a PC board, the PC board having a characteristically very flat, defect-free surface on which the rear element is structurally supported; and heater traces on the PC board and also a circuit on the PC board for controlling heating of the heater traces.

34. The mirror assembly defined in claim 33, wherein one of the front and rear elements are less than about 1.1 mm thick.

35. The mirror assembly defined in claim 34, wherein both of the front and rear elements are less than about 1.1 mm thick.

36. A method comprising steps of:

providing an EC mirror subassembly having front and rear elements that are each less than about 1.6 mm thick and characteristically very lightweight, but further having a reflector associated with the rear element, and wherein the front and rear elements each have a long dimension and a thickness satisfying the equation $L/T^2 > 75/mm$, where L=a long dimension across the rear element, and where T=a thickness of a thickest one of the front and rear elements;

providing a carrier configured to co-extensively support the EC mirror subassembly to keep the EC mirror subassembly from being stressed and bent in a thickness direction perpendicular to the reflector; and securing the rear element to the carrier in a distortion-free condition.

37. The method defined in claim 36, wherein the step of providing the EC mirror subassembly includes providing a seal spacing the front and rear elements apart to form a chamber, and further includes locating an EC material in the chamber, the EC material being one of solution phase EC material, gel phase EC material, or a hybrid thereof.

38. The method defined in claim 37, wherein the front and rear elements both have a thickness of less than about 1.1 mm.

* * * * *